(12) United States Patent
Kim et al.

(10) Patent No.: US 11,402,916 B2
(45) Date of Patent: Aug. 2, 2022

(54) TOUCH DISPLAY DEVICE, DRIVING METHOD, AND DRIVING CIRCUIT

(71) Applicant: LG Display Co., Ltd., Seoul (KR)

(72) Inventors: CheolSe Kim, Daegu (KR); HoonBae Kim, Seoul (KR); SunYeop Kim, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/469,455

(22) Filed: Sep. 8, 2021

(65) Prior Publication Data
US 2021/0405757 A1    Dec. 30, 2021

Related U.S. Application Data

(63) Continuation of application No. 16/875,291, filed on May 15, 2020, now Pat. No. 11,144,126, which is a
(Continued)

(30) Foreign Application Priority Data

Aug. 28, 2017  (KR) .......................... 10-2017-0108889
Dec. 18, 2017  (KR) .......................... 10-2017-0174260

(51) Int. Cl.
  *G06F 3/01*  (2006.01)
  *G09G 3/20*  (2006.01)
  (Continued)

(52) U.S. Cl.
  CPC ............ *G06F 3/016* (2013.01); *G06F 3/0412* (2013.01); *G06F 3/04184* (2019.05);
  (Continued)

(58) Field of Classification Search
  CPC .... G06F 3/016; G06F 3/0412; G06F 3/04184; G06F 3/0443; G06F 1/26; G09G 3/2092;
  (Continued)

(56) References Cited

U.S. PATENT DOCUMENTS

2016/0180816 A1*  6/2016  Hwang ................ G09G 3/3655
                                                           345/99
2016/0329022 A1*  11/2016 Yun .......................... G09G 3/00
(Continued)

FOREIGN PATENT DOCUMENTS

KR   10-2017-0043983 A    4/2017

OTHER PUBLICATIONS

Korean Intellectual Property Office, Office Action, KR Patent Application No. 10-2017-0174260, dated Dec. 13, 2021, 16 pages.

*Primary Examiner* — Andrew Sasinowski
(74) *Attorney, Agent, or Firm* — Fenwick & West LLP

(57) ABSTRACT

Embodiments of the present disclosure relate to a touch display device, a driving method, and a driving circuit. More particularly, embodiments of the present disclosure relate to a touch display device, a driving method, and a driving circuit capable of preventing touch sensitivity from being affected by display driving even though simultaneously performing the display driving and touch driving by supplying a data voltage to a plurality of data lines disposed in a display panel, supplying a common voltage to a plurality of common electrodes disposed in the display panel, displaying an image through the display panel, and supplying a common voltage to the common electrodes.

20 Claims, 18 Drawing Sheets

Related U.S. Application Data continuation of application No. 16/112,320, filed on Aug. 24, 2018, now Pat. No. 10,691,259.

(51) Int. Cl.
*G06F 3/041* (2006.01)
*G09G 3/36* (2006.01)
*G06F 3/044* (2006.01)

(52) U.S. Cl.
CPC ......... *G09G 3/2092* (2013.01); *G06F 3/0443* (2019.05); *G09G 3/3655* (2013.01); *G09G 2310/0275* (2013.01); *G09G 2310/08* (2013.01)

(58) Field of Classification Search
CPC ......... G09G 3/3655; G09G 2310/0275; G09G 2310/08
See application file for complete search history.

(56) References Cited

U.S. PATENT DOCUMENTS

2017/0102825 A1* 4/2017 Kim .................. G06F 3/041
2017/0192580 A1* 7/2017 Jung ................ G02F 1/134309

* cited by examiner

TOUCH DISPLAY DEVICE, DRIVING METHOD, AND DRIVING CIRCUIT

CROSS REFERENCE TO RELATED APPLICATION

This application is a continuation of U.S. patent application Ser. No. 16/875,291 filed on May 15, 2020 which is a continuation of U.S. patent application Ser. No. 16/112,320 filed on Aug. 24, 2018 which claims priority from Republic of Korea Patent Application No. 10-2017-0108889 filed on Aug. 28, 2017 and Republic of Korea Patent Application No. 10-2017-0174260 filed on Dec. 18, 2017, each of which is hereby incorporated by reference in its entirety.

BACKGROUND

1. Field of Technology

The present disclosure relates to a touch display device, a driving method, and a driving circuit.

2. Description of the Prior Art

As a society develops into an information society, there is increasing demand for various types of display devices for displaying images. In recent years, various display devices such as a liquid crystal display device, a plasma display device, and an organic light-emitting diode display device have been utilized.

Among such display devices, there is a touch display device capable of providing a touch-based input method that enables a user to easily input information or a command intuitively and conveniently, breaking from the conventional input methods using a button, a keyboard, a mouse, etc.

Such a touch display device should provide both an image display function and a touch sensing function. Thus, the touch display device divides a driving time such as a frame time into a display driving period and a touch driving period, performs display driving in the display driving period, and performs touch driving and touch sensing in the touch driving period subsequent to the display driving period.

In the case of the above-described time division driving method, in order to perform the display driving and the touch driving in a time division manner, a very precise timing control is required and expensive components for this may be required.

In addition, the time division driving method has a problem in that since both the display driving time and the touch driving time may be insufficient, both the image quality and the touch sensitivity are deteriorated. In particular, there is a problem in that high-resolution image quality cannot be provided due to time division driving.

SUMMARY

In view of the foregoing, embodiments of the present disclosure are to provide a touch display device, a driving method, and a driving circuit capable of simultaneously performing display driving and touch driving.

Also, embodiments of the present disclosure are to provide a touch display device, a driving method, and a driving circuit that prevent touch sensitivity from being affected by display driving.

Further, embodiments of the present disclosure are to provide a touch display device, a driving method, and a driving circuit capable of performing touch sensing without being affected by data driving.

Further, embodiments of the present disclosure are to provide a touch display device, a driving method, and a driving circuit capable of preventing touch sensing from being disabled or a touch sensitivity from being deteriorated even if a voltage state of a data voltage is changed.

Moreover, embodiments of the present disclosure are to provide a touch display device, a driving method, and a driving circuit capable of preventing touch sensing from being disabled or a touch sensitivity from being deteriorated in a specific display pattern.

Also, embodiments of the present disclosure are to provide a touch display device, a driving method, and a driving circuit, which can simultaneously perform display driving and touch driving while preventing the occurrence of a display touch crosstalk including distortion of a touch-related signal by display driving.

Embodiments of the present disclosure may provide a touch display device comprising: a display panel including a plurality of data lines, a plurality of gate lines, a plurality of sub-pixels defined by the plurality of data lines and the plurality of gate lines, and a plurality of common electrodes; a first circuit configured to supply a data voltage to the plurality of data lines, supply a common voltage that alternates between a first common voltage level and a second common voltage level that is greater than the first common voltage level to the plurality of common electrodes, and detect a signal from at least one of the plurality of common electrodes, wherein the common voltage changes from the first common voltage level to the second common voltage level at a predetermined time after the data voltage changes from a first data voltage level to a second data voltage level that is greater than the first data voltage level or at a predetermined time after a data synchronous signal that is synchronized with the data voltage changes from a first signal level to a second signal level that is less than the first signal level; and a second circuit configured to sense a touch based on a signal detected by the first circuit.

In one embodiment, a method of driving a touch display device comprising a display panel that includes a plurality of data lines, a plurality of gate lines, a plurality of sub-pixels defined by the plurality of data lines and the plurality of gate lines, and a plurality of common electrodes, the method comprises: supplying a data voltage to the plurality of data lines; supplying a common voltage that alternates between a first common voltage level and a second common voltage level that is greater than the first common voltage level to the plurality of common electrodes, wherein the common voltage changes from the first common voltage level to the second common voltage level at a predetermined time after the data voltage changes from a first data voltage level to a second data voltage level that is greater than the first data voltage level or at a predetermined time after a data synchronous signal that is synchronized with the data voltage changes from a first signal level to a second signal level that is less than the first signal level; and displaying an image through the display panel and sensing a touch based on a signal detected from at least one of the plurality of common electrodes.

In one embodiment, A driving circuit of a touch display device comprising a display panel including plurality of data lines, a plurality of gate lines, a plurality of sub-pixels defined by the plurality of data lines and the plurality of gate lines, and a plurality of common electrodes, the driving circuit comprises: a first driving circuit configured to supply a data voltage to the plurality of data lines; and a second driving circuit configured to supply a common voltage that alternates between a first common voltage level and a second common voltage level that is greater than the first common voltage level to the plurality of common electrodes, and detect a signal for touch sensing from at least one of the plurality of common electrodes; wherein the common voltage changes from the first common voltage level to the second common voltage level at a predetermined time after the data voltage changes from a first data voltage level to a second data voltage level that is greater than the first data voltage level or at a predetermined time after a data synchronous signal that is synchronized with the data voltage changes from a first signal level to a second signal level that is less than the first signal level.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION OF THE EXEMPLARY EMBODIMENTS

Figure 1:
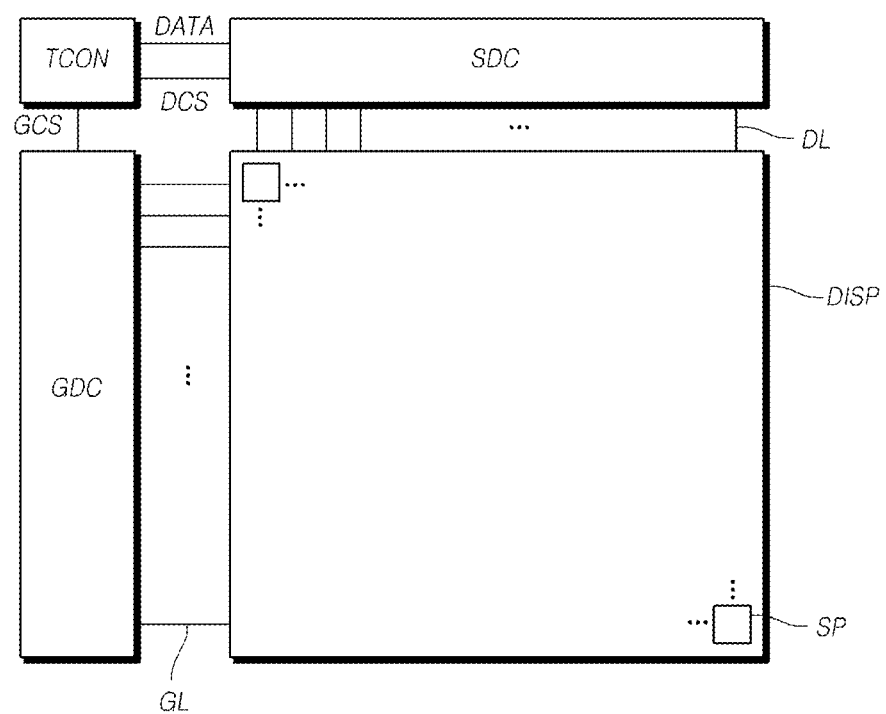
FIGS. 1 and 2 are system configuration diagrams of a touch display device according to embodiments of the present disclosure.

Hereinafter, some embodiments of the present disclosure will be described in detail with reference to the accompanying illustrative drawings. In designating elements of the drawings by reference numerals, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

In addition, terms, such as first, second, A, B, (a), (b) or the like may be used herein when describing components of the present disclosure. Each of these terminologies is not used to define an essence, order or sequence of a corresponding component but used merely to distinguish the corresponding component from other component(s). In the case that it is described that a certain structural element "is connected to", "is coupled to", or "is in contact with" another structural element, it should be interpreted that another structural element may "be connected to", "be coupled to", or "be in contact with" the structural elements as well as that the certain structural element is directly connected to or is in direct contact with another structural element.

Figure 2:
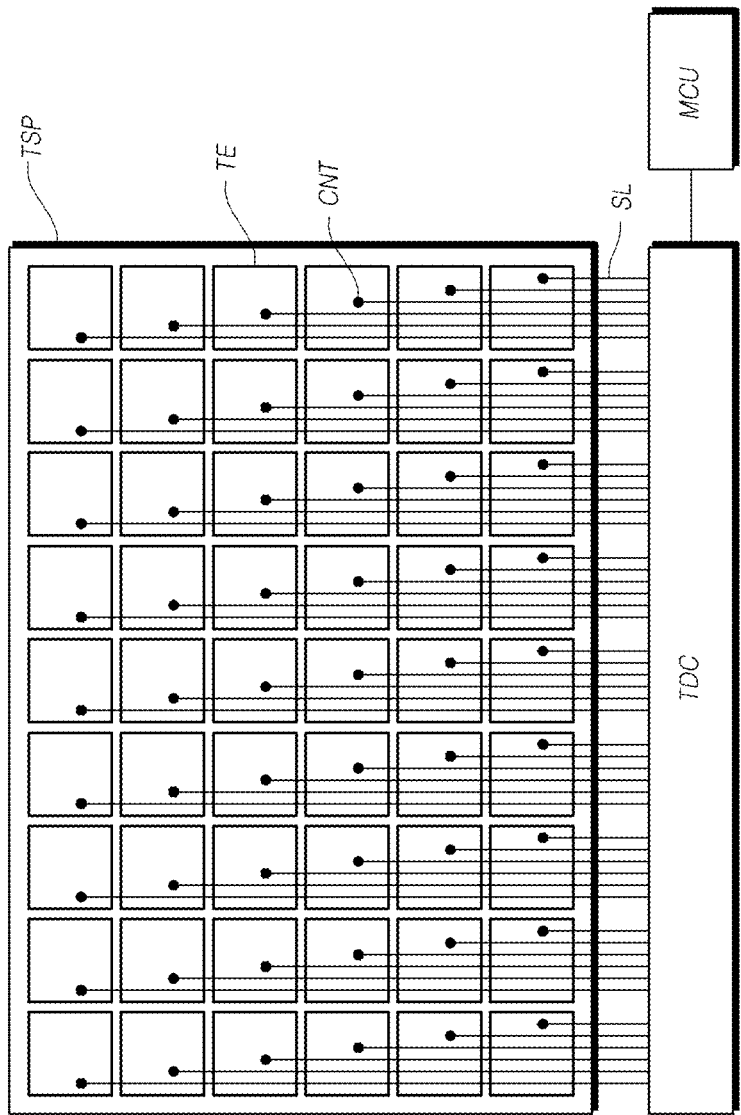

FIGS. 1 and 2 are system configuration diagrams of a touch display device according to embodiments of the present disclosure.

A touch display device according to embodiments of the present disclosure is capable of performing an image display function and a touch sensing function (touch input function).

Hereinafter, configurations for providing an image display function of the touch display device according to embodiments of the present disclosure will be described with reference to FIG. 1, and configurations for providing the touch sensing function (touch input function) of the touch display device according to embodiments of the present disclosure will be described with reference to FIG. 2.

Referring to FIG. 1, the touch display device according to embodiments of the present disclosure includes: a display panel DISP, on which a plurality of data lines DL and a plurality of gate lines GL are disposed and a plurality of sub-pixels SP defined by the plurality of data lines DL and the plurality of gate lines GL are arranged; a source driving circuit SDC configured to drive the plurality of data lines DL; a gate driving circuit GDC configured to drive the plurality of gate lines GL; a timing controller TCON configured to control the source driving circuit SDC and the gate driving circuit GDC; and the like.

On the display panel DISP, a pixel electrode in each sub-pixel SP may be disposed.

A pixel voltage may be applied to the pixel electrode of each sub-pixel SP.

Further, one common electrode or two or more common electrodes to which a common voltage is applied may be disposed on the display panel DISP.

The one common electrode is one cylindrical electrode formed on the front surface of the display panel DISP.

The two or more common electrodes may be regarded as electrodes obtained by dividing one cylindrical electrode into two or more electrodes. Each of the two or more common electrodes may have a size larger than the size of one sub-pixel area.

In each sub-pixel SP, an electric field may be formed by a pixel voltage (which may be a data voltage) applied to the pixel electrode and a common voltage applied to the common electrode.

The timing controller TCON supplies various driving control signals DCS and GCS to the source driving circuit SDC and the gate driving circuit GDC so as to control the source driving circuit SDC and the gate driving circuit GDC.

The timing controller TCON starts scanning according to timing implemented in each frame, converts input image data input from the outside to be suitable for a data signal form used in the source driving circuit SDC, outputs the converted image data DATA, and controls data driving at a proper time according to the scanning.

The above-mentioned timing controller TCON receives, from the outside (e.g., a host system), various timing signals including a vertical synchronous signal Vsync, a horizontal synchronous signal Hsync, an input data enable (DE) signal, a clock signal CLK, etc. together with input image data.

In addition to converting the input image data input from the outside to be suitable for a data signal form used in the source driving circuit SDC and outputting the converted image data, in order to control the source driving circuit SDC and the gate driving circuit GDC, the timing controller TCON receives timing signals such as a vertical synchronous signal Vsync, a horizontal synchronous signal Hsync, an input DE signal, and a clock signal, generates various control signals, and outputs the control signals to the source driving circuit SDC and the gate driving circuit GDC.

For example, in order to control the gate driving circuit GDC, the timing controller TCON may output various gate control signals GCS including a gate start pulse (GSP), a gate shift clock (GSC), a gate output enable (GOE) signal, etc.

Here, the GSP controls the operation start timing of one or more gate driver integrated circuits constituting the gate driving circuit GDC. The GSC is a clock signal commonly input to the one or more gate driver integrated circuits and controls the shift timing of a scan signal (a gate pulse). The GOE signal designates the timing information of the one or more gate driver integrated circuits.

In addition, in order to control the data driving circuit SDC, the timing controller TCON may output various data driving control signals DCS including a source start pulse (SSP), a source sampling clock (SSC), a source output enable signal (SOE), etc.

Here, the SSP controls the data sampling start timing of one or more source driver integrated circuits constituting the source driving circuit SDC. The SSC is a clock signal for controlling the sampling timing of data in each of the source drive integrated circuits. The SOE controls the output timing of the source driving circuit SDC.

The timing controller TCON may be a control device that further performs other control functions including the function of the timing controller.

The timing controller TCON may be implemented as a component separate from the source driving circuit SDC, or as an integrated circuit by being integrated with the source driving circuit SDC.

The source driving circuit SDC receives the image data DATA input from the timing controller TCON and supplies a data voltage to the plurality of data lines DL so as to drive the plurality of data lines DL. Here, the source driving circuit SDC is also referred to as a data driving circuit.

The source driving circuit SDC may be implemented by including one or more source driver integrated circuits (SDIC).

Each SDIC may include a shift register, a latch circuit, a digital to analog converter (DAC), an output buffer, etc.

Each SDIC may further include an analog to digital converter (ADC) in some cases.

Each SDIC may be connected to a bonding pad of the display panel DISP through a tape automated bonding (TAB) method or a chip-on-glass (COG) method or may be disposed directly on the display panel DISP. In some cases, the SDIC may be disposed by being integrated in the display panel DISP. In addition, each SDIC may be implemented by a chip-on-film (COF) method in which the SDIC is mounted on a film connected to the display panel DISP.

The gate driving circuit GDC sequentially supplies scan signals to the plurality of gate lines GL so as to sequentially drive the plurality of gate lines GL. Here, the gate driving circuit GDC is also referred to as a scan driving circuit.

The gate driving circuit GDC may be implemented to include one or more GDICs.

Each GDIC may include a shift register, a level shifter, etc.

Each GDIC may be connected to a bonding pad of the display panel DISP through the TAB method or the COG method, or may be disposed directly on the display panel DISP by being implemented in a gate-in-panel (GIP) type. In some cases, each GDIC may be disposed by being integrated in the display panel DISP. In addition, each GDIC may be implemented in the COF method, in which the GDIC is mounted on a film connected to the display panel DISP.

The gate driving circuit GDC sequentially supplies a scan signal of an ON voltage or an OFF voltage to the plurality of gate lines GL under the control of the timing controller TCON.

When a specific gate line is opened by the gate driving circuit GDC, the source driving circuit SDC converts image data DATA received from the timing controller TCON into an analog-type data voltage and supplies the data voltage to the plurality of data lines DL.

The source driving circuit SDC may be located only on one side (e.g., the upper side or the lower side) of the display panel DISP, or may be located on both sides (e.g., the upper side and the lower side) of the display panel DISP depending on a driving method, a panel design method, etc. in some cases.

The gate driving circuit GDC may be located only on one side (e.g., the left side or the right side) of the display panel DISP, or may be located on both sides (e.g., the left side and the right side) of the display panel DISP depending on a driving method, a panel design method, etc. in some cases.

Referring to FIG. 2, the touch display device according to embodiments of the present disclosure may include a touch screen panel TSP, a touch driving circuit TDC, a micro control unit MCU, etc. in order to provide the touch sensing function.

The touch screen panel TSP may include a plurality of touch electrodes TE and a plurality of signal lines SL electrically connected to the plurality of touch electrodes TE.

For example, one touch electrode TE may be electrically connected to one signal line SL or two or more signal lines SL through one or more contact holes or the like.

The touch driving circuit TDC may drive the touch screen panel TSP so as to generate and output sensing data (touch raw data).

For example, the touch driving circuit TDC may supply a touch driving signal to all or some of the plurality of touch electrodes TE arranged in the touch screen panel TSP, and may detect a signal from at least one touch electrode TE, thereby generating and outputting sensing data (touch raw data).

The touch driving circuit TDC may supply a touch driving signal to one or more touch electrodes TE through one or more signal lines SL, and may detect a signal.

The micro control unit MCU may obtain the presence or absence of a touch and/or touch coordinates using sensing data output from the touch driving circuit TDC.

The touch display device according to embodiments of the present disclosure may sense a touch based on self-capacitance, or may sense a touch based on mutual-capacitance. Hereinafter, for the convenience of explanation, a description will be made of a case where a touch is sensed based on self-capacitance as an example.

The touch screen panel TSP may be manufactured separately from the display panel DISP, and may be bonded to the display panel DISP or embedded in the display panel DISP.

When the touch screen panel TSP is embedded in the display panel DISP, the touch screen panel TSP may be regarded as an assembly of a plurality of touch electrodes TE and a plurality of signal lines SL.

The touch driving circuit TDC and the micro control unit MCU are two circuits for touch sensing. The touch driving circuit TDC is also referred to as a first circuit, and the micro control unit MCU is also referred to as a second circuit.

The touch driving circuit TDC and the source driving circuit SDC may be integrally implemented. In this case, an integrated driving circuit including both the touch driving circuit TDC and the source driving circuit SDC is also referred to as a first circuit.

Figure 3:
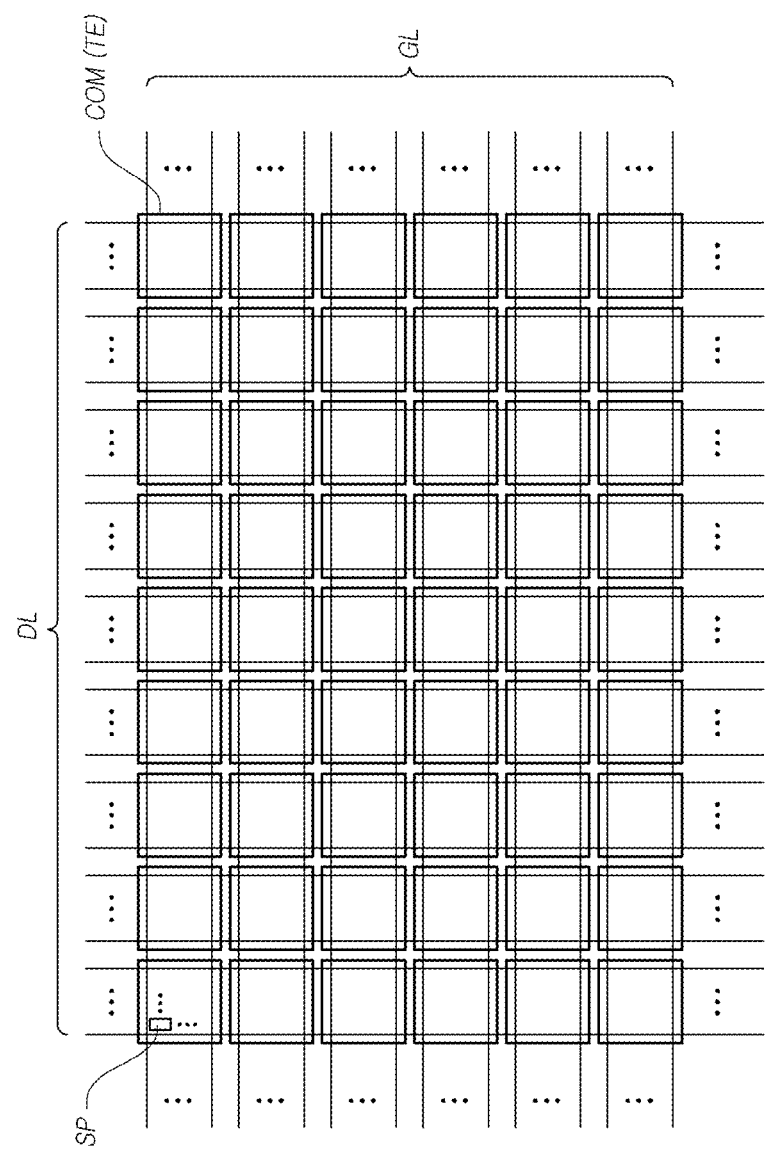
FIG. 3 is a diagram illustrating a case in which a touch screen panel is embedded in the display panel of the touch display device according to embodiments of the present disclosure.

FIG. 3 is a diagram illustrating a case where a touch screen panel TSP is embedded in the display panel DISP of the touch display device according to embodiments of the present disclosure.

When the touch screen panel TSP is embedded in the display panel DISP, a plurality of common electrodes COM disposed on the display panel TSP may be utilized as a plurality of touch electrodes TE.

Accordingly, a common voltage may be applied to the plurality of common electrodes COM for image display, and a touch driving signal may be applied to all or some of the plurality of common electrodes COM for touch sensing.

An area of each of the plurality of common electrodes COM may overlap an area of two or more sub-pixels SP.

That is, the size of the area of one common electrode COM may correspond to the size of the area of two or more sub-pixels SP.

Accordingly, two or more gate lines GL may pass through the area of one common electrode COM.

According to the above description, the speed, efficiency, or performance of touch driving and touch sensitivity may be adjusted by adjusting the size of the common electrodes COM.

Figure 4:
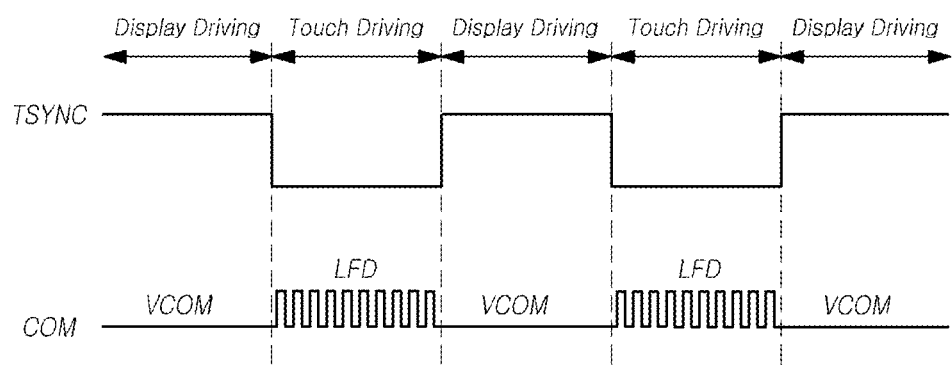
FIG. 4 is a diagram illustrating time-divisional driving of the touch display device according to embodiments of the present disclosure.
Figure 5:
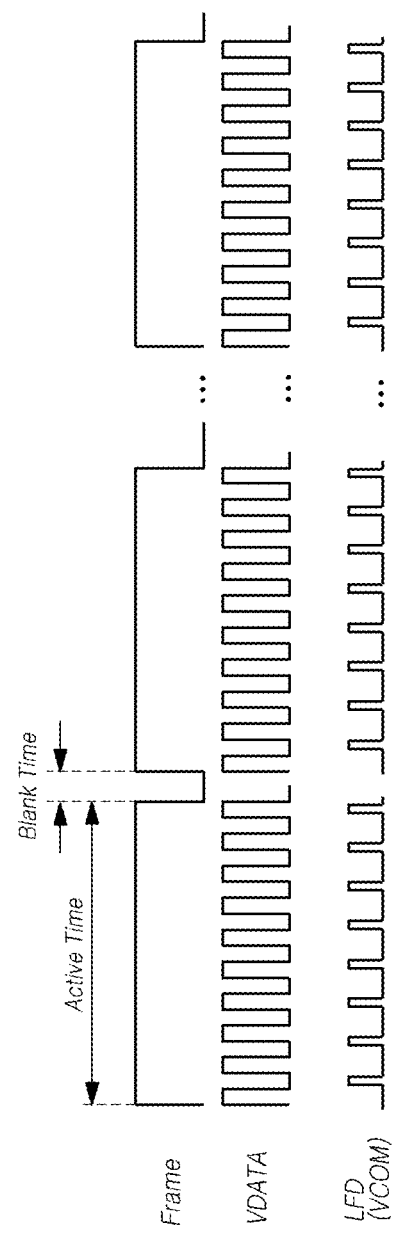
FIG. 5 is a diagram illustrating time-free driving of the touch display device according to embodiments of the present disclosure.

FIG. 4 is a diagram illustrating time-divisional driving of the touch display device according to embodiments of the present disclosure, and FIG. 5 is a diagram illustrating time-free driving of the touch display device according to embodiments of the present disclosure.

The touch display device according to embodiments of the present disclosure may perform a driving operation in a time-divisional driving method and/or a time-free driving method.

Referring to FIG. 4, when performing the driving operation in the time-divisional driving method, the touch display device according to embodiments of the present disclosure may perform the display driving for providing an image display function and the touch driving for providing a touch sensing function in the time-divisional display driving period and the touch driving period, respectively.

The display driving period and the touch driving period may be controlled in timing by a touch synchronous signal TSYNC.

During the display driving period, a common voltage VCOM, which is a DC voltage, may be applied to the plurality of common electrodes COM.

During the touch driving period, a touch driving signal LFD, which is an AC voltage (modulated signal), may be applied to all or some of the plurality of common electrodes COM. At this time, the touch driving signal LFD or a signal corresponding thereto may be applied to all or some of the data lines DL. At this time, the touch driving signal LFD or a signal corresponding thereto may be further applied to all or some of the gate lines GL.

Referring to FIG. 5, when performing the driving operation in the time-free driving method, the touch display device according to embodiments of the present disclosure may simultaneously perform the display driving for providing an image display function and the touch driving for providing a touch sensing function. Such a time-free driving method is also referred to as a simultaneous driving method.

One frame time may correspond to one active time and one blank time.

When the touch display device according to embodiments of the present disclosure performs the driving operation in the time-free driving mode, a data voltage VDATA may be supplied to the data lines DL during the active time at every frame time. At this time, a common voltage VCOM, which also serves as the touch driving signal LFD, may be supplied to the plurality of common electrodes COM.

Meanwhile, the touch display device according to embodiments of the present disclosure may always perform the driving operation in the time-divisional driving method, may always perform the driving operation in the time-free driving method, or may perform the driving operation using both the time-divisional driving method and the time-free driving method.

Hereinafter, a case in which the touch display device according to embodiments of the present disclosure performs the driving operation in the time-free driving method will be described as an example.

When the touch display device according to embodiments of the present disclosure performs the driving operation in the time-free driving method, the plurality of common electrodes COM may be regarded as a plurality of touch electrodes TE, and the common voltage VCOM may be regarded as a touch driving signal LFD.

Figure 6:
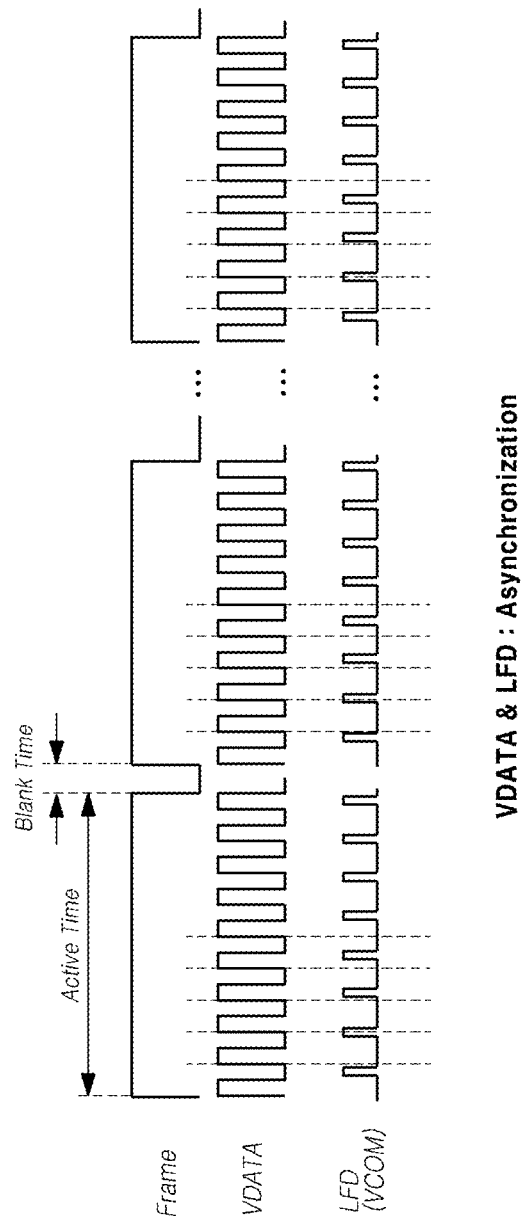
FIG. 6 is a diagram illustrating asynchronization between a data voltage and a common voltage during time-free driving of the touch display device according to embodiments of the present disclosure.
Figure 7:
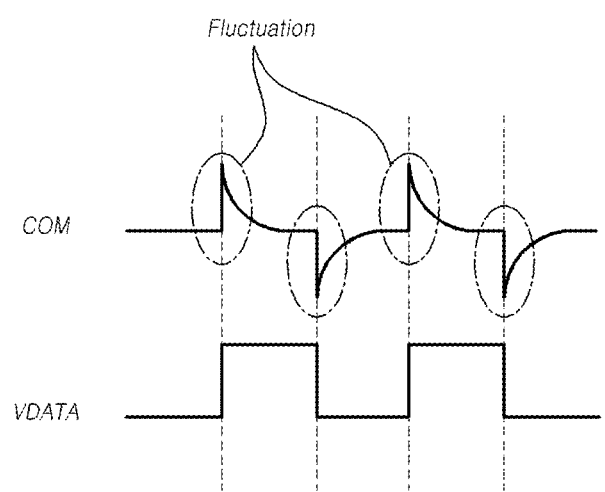
FIG. 7 is a diagram illustrating a voltage fluctuation phenomenon occurring in a common electrode according to a state change of a data voltage during asynchronization between a data voltage and a common voltage in the touch display device according to embodiments of the present disclosure.

FIG. 6 is a diagram illustrating asynchronization between a data voltage VDATA and a common voltage VCOM during the time-free driving of the touch display device according to embodiments of the present disclosure, and FIG. 7 is a diagram illustrating a voltage fluctuation phenomenon occurring in a common electrode COM according to a state change of the data voltage VDATA during asynchronization between the data voltage VDATA and the common voltage VCOM.

However, FIG. 7 illustrates a phenomenon in which a voltage fluctuation occurs in the common voltage COM when a state change occurs in the data voltage VDATA in the state in which a DC voltage is applied to the common electrode COM in order to examine a voltage state fluctuation in the common electrode COM according to a state change in the data voltage VDATA.

Referring to FIG. 6, during the time-free driving of the touch display device according to embodiments of the present disclosure, the data voltage VDATA applied to pixel electrodes via the data lines DL for image display and the common voltage VCOM applied to the common electrodes COM for image display and touch sensing may have different frequencies and may not be synchronized with each other.

Referring to FIGS. 6 and 7, in the specific pattern of a characteristic inversion method, the data voltage VDATA may undergo a state transition in which the voltage level greatly changes.

Due to this, as illustrated in FIG. 7, the common electrode COM to which the DC voltage is applied may undergo a fluctuation in the voltage state at the time of state change in the data voltage, rather than being maintained in the DC voltage state.

When the voltage value of the data voltage VDATA is raised, that is, when the data voltage VDATA rises, the common electrode COM to which the DC voltage has been applied may undergo a fluctuation in the voltage state in which the voltage instantaneously significantly rises from a corresponding DC voltage and then returns to the corresponding DC voltage.

When the voltage value of the data voltage VDATA is lowered, that is, when the data voltage VDATA falls, the common electrode COM to which the DC voltage has been applied may undergo a change in voltage state in which the voltage instantaneously significantly falls from a corresponding DC voltage and then returns to the corresponding DC voltage.

As described above, when a voltage state change of the common electrodes COM acting as the touch electrodes TE according to the state change of the data voltage VDATA, a signal detected from the common electrodes COM applied with the common voltage VOM may also be distorted.

Accordingly, since the touch driving circuit TDC detects the distorted signal to generate sensing raw data, and the micro control unit MCU determines the presence or absence of a touch and/or touch coordinates using the sensing raw data generated based on the distorted signal, the presence or absence of a touch and touch coordinates may not be determined or may be erroneously determined. That is, a touch sensing error may occur or touch sensitivity may be lowered.

As described above, a phenomenon in which a touch sensing error occurs or touch sensitivity is lowered due to the occurrence of a voltage state fluctuation in the common electrode COM acting as a touch electrode TE according to the state change in the data voltage VDATA is called a Display Touch Crosstalk (DTX).

Figure 8:
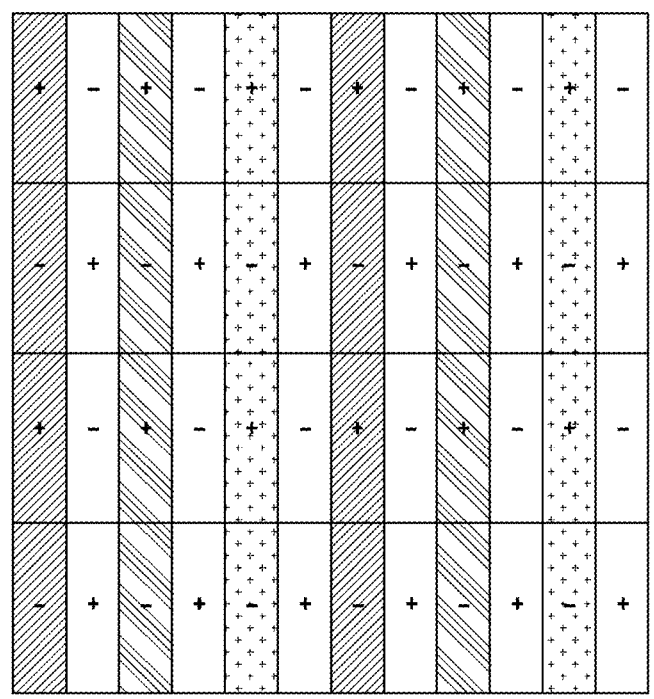
FIG. 8 is a diagram exemplifying an image pattern generating a display touch crosstalk according to a voltage fluctuation phenomenon at a common voltage in the touch display device according to embodiments of the present disclosure.
Figure 9:
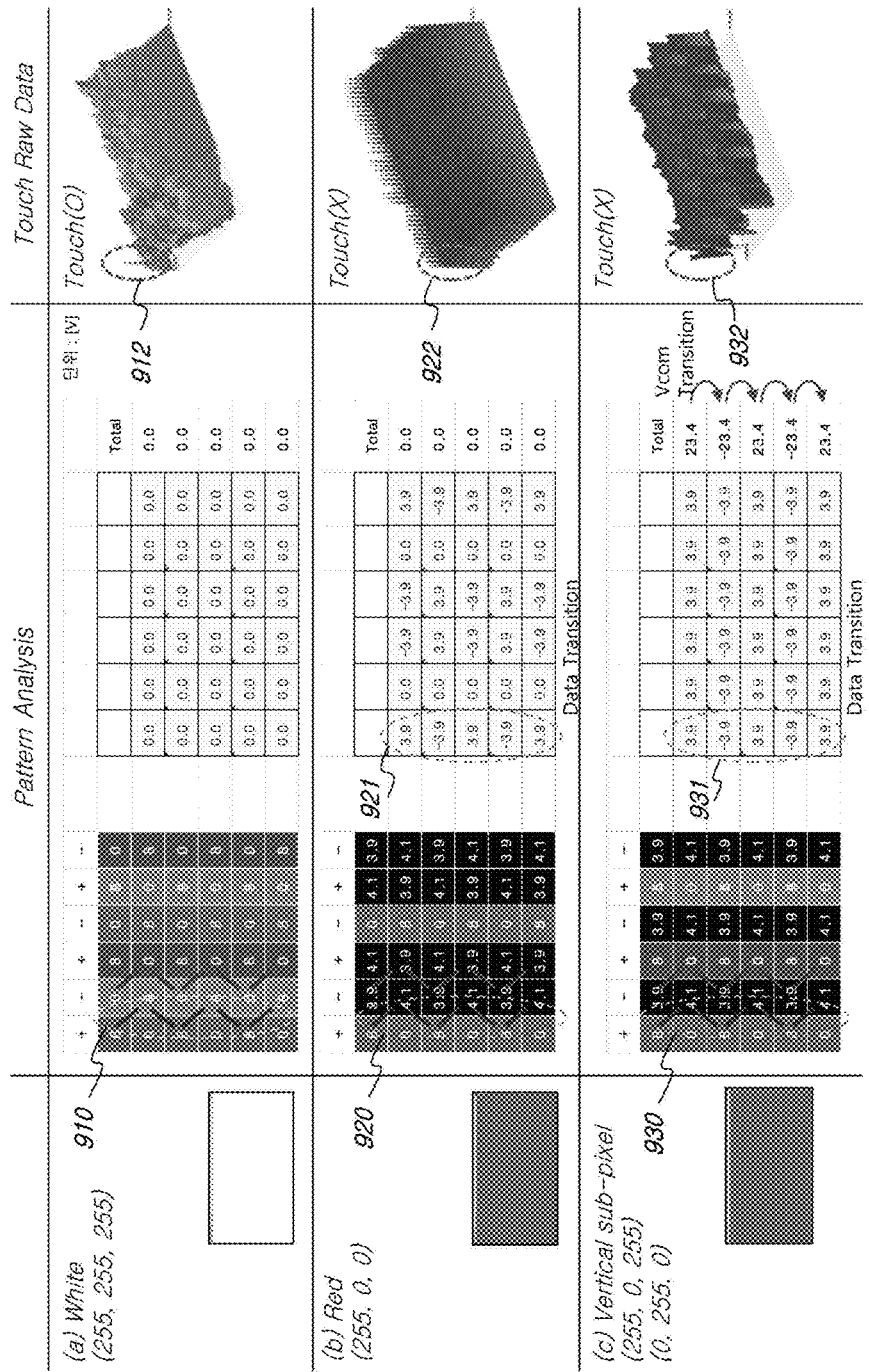
FIG. 9 is a diagram for explaining a touch signal distortion phenomenon caused by a display touch crosstalk according to a voltage fluctuation phenomenon at a common voltage in the touch display device according to embodiments of the present disclosure.

FIG. 8 is a diagram exemplifying an image pattern generating a display touch crosstalk according to a voltage fluctuation phenomenon at a common voltage VCOM in the touch display device according to embodiments of the present disclosure, and FIG. 9 is a diagram for explaining a touch signal distortion phenomenon caused by a display touch crosstalk according to a voltage fluctuation phenomenon at a common voltage VCOM in the touch display device according to embodiments of the present disclosure.

The state change of the data voltage VDATA, which may generate a display touch crosstalk, and the voltage state change caused thereby in the common electrode COM may be caused by a specific display pattern.

For example, when driving an image with an inversion method, the display touch crosstalk may occur.

Examples of the inversion method, which may generate the display touch crosstalk, include a frame inversion method, a line inversion method, a column inversion method, a dot inversion method, etc. and there is also a Z-Inversion method.

Here, the frame inversion method, the line inversion method, and the column inversion method are capable of reducing the power consumption compared to the dot inversion method, but have an image quality degradation problem in that a crosstalk phenomenon occurs or a difference in vertical luminance occurs. On the other hand, the dot inversion method is capable of reducing the image quality degradation problem described above, and thus capable of providing images of excellent image quality compared to the frame inversion method, the line inversion method, and the column inversion method. However, the dot inversion method has a problem in that it consumes too much power compared to the line inversion method or the column inversion method.

Referring to FIG. 8, the Z-inversion method is an inversion method for solving the problem of the other inversion methods described above. The Z-inversion method supplies a data voltage in a column inversion method to data lines in which transistors and pixel electrodes are arranged alternately to the left and right.

Referring to FIG. 8, the Z-inversion method has an improved structure of a column inversion type, and uses a column inversion method in the circuit driving method, but screen displaying is implemented in the same manner as the dot inversion method by making the directions of transistors of the display panel DISP reversed for each line. In addition, the Z-inversion method is excellent in image quality by using the column inversion method in terms of data and is capable of reducing power consumption while having an effect similar to that of the dot inversion method in image quality.

When image driving is performed by the Z-inversion method, that is, when a display pattern of the Z-inversion method is displayed, the state change of the data voltage VDATA may occur more severely compared to the other inversion methods. As a result, the voltage state fluctuation in the common electrode COM may occur more severely, and thus the display touch crosstalk may occur more seriously.

The state change in the data voltage VDATA does not always occur seriously when image driving is performed in the Z-inversion method, but may occur seriously in a specific display pattern.

In (a), (b), and (c) in FIG. 9, each of the sub-pixel connection marks 910, 920, and 930 indicates sub-pixels SP connected to the same data line DL in the case of the Z-inversion method.

In (a), (b), and (c) in FIG. 9, for the convenience of explanation, a data voltage VDATA corresponding to 255 gradation is represented by 8 (positive) and 0 (negative) according to polarity inversion, and a data voltage VDATA corresponding to the 0 gradation is represented by 3.9 and 4.1.

Touch raw data is sensing data obtained in the touch driving circuit TDC and includes sensing values for respective positions. In (a), (b), and (c) in FIG. 9, the graphics for touch raw data represent the magnitudes of sensing values for respective positions on a plane as heights.

Referring to (a) in FIG. 9, for example, when the red sub-pixel columns, the green sub-pixel columns, and the blue sub-pixel columns are all turned ON in order to represent white (255, 255, 255), all the voltage differences in the data voltage VDATA supplied to the sub-pixels 910 connected to the same data line DL become 0 [V]. That is, no state change occurs in the data voltage VDATA.

Accordingly, in the touch raw data obtained in the touch driving circuit TDC, a sensing value 912 at a position where a touch actually occurs has a magnitude different from those of sensing values at other positions. Therefore, in the case of (a) in FIG. 9, a touch can be accurately sensed.

Referring to (b) in FIG. 9, for example, when only the red sub-pixel columns are turned ON and the green sub-pixel columns and the blue sub-pixel columns are turned OFF in order to represent red (255, 0, 0), a voltage difference in the data voltage VDATA supplied to the sub-pixels 920 connected to the same data line DL may become 3.9 [V] or −3.9 [V], or may become 0 [V].

The sum of voltage differences of the data voltage VDATA in one line (one sub-pixel row) becomes 0 [V].

However, in some columns (sub-pixel columns) 921, the data voltage VDATA changes from 3.9 [V] to −3.9 [V] or from −3.9 [V] to 3.9 [V].

That is, in some columns (sub-pixel columns) 921, the voltage state change width in the data voltage VDATA is 7.8 [V], and thus the voltage state change of the data voltage VDATA occurs very much.

Accordingly, in the touch raw data obtained in the touch driving circuit TDC, a sensing value 922 at a position where a touch actually occurs has a magnitude similar to those of sensing values at other positions. Therefore, in the case of (b) in FIG. 9, a touch cannot be sensed at some column positions.

Referring to (c) in FIG. 9, for example, when the red sub-pixel columns are turned ON, the green sub-pixel columns are turned OFF, and the blue sub-pixel columns are turned ON (255, 0, 255) or when the red sub-pixel columns are turned OFF, the green sub-pixel columns are turned ON, and the blue sub-pixel columns are turned OFF (0, 255, 0), a voltage difference in the data voltage VDATA supplied to the sub-pixels 930 connected to the same data line DL may become 3.9 [V] or −3.9 [V].

Therefore, in all the columns (sub-pixel columns) 931, the data voltage VDATA is changed from 3.9 [V] to −3.9 [V] or from −3.9 [V] to 3.9 [V].

That is, in all the columns (sub-pixel columns) 931, the voltage state change width in the data voltage VDATA is 7.8 [V], and thus the voltage state change of the data voltage VDATA occurs very much.

In addition, in the example of (c) in FIG. 9, the sum of voltage differences of the data voltage VDATA in one line (one sub-pixel row) becomes 23.4 [V] or −23.4 [V].

Therefore, the sum of voltage differences in the data voltage VDATA between the lines may be greatly changed from 23.4 [V] to −23.4 [V]. This means that the voltage state of the common voltage VCOM applied to the common electrode COM greatly fluctuates.

Accordingly, in the touch raw data obtained in the touch driving circuit TDC, a sensing value 932 at a position where a touch actually occurs has a magnitude indistinguishably similar to those of sensing values at other positions. Therefore, in the case of (a) in FIG. 9, a touch cannot be sensed.

As described above, the voltage state fluctuation of the common electrode COM corresponding to the touch electrode TE occurs according to the state change of the data voltage VDATA. This means that the common electrode COM corresponding to the touch electrode TE is affected by the data line DL.

As a result, the touch sensitivity may be deteriorated or a display touch crosstalk (DTX) may occur.

Therefore, embodiments of the present disclosure are capable of providing a driving method capable of eliminating a display touch crosstalk without deteriorating the touch sensitivity even if the voltage state fluctuation of the data voltage in a common electrode COM corresponding to a touch electrode TE occurs according to the state change of a data voltage VDATA in a data line DL.

In other words, embodiments of the present disclosure are capable of providing a driving method capable of minimizing the influence of a common electrode COM corresponding to a touch electrode TE by a data line DL.

Figure 10:
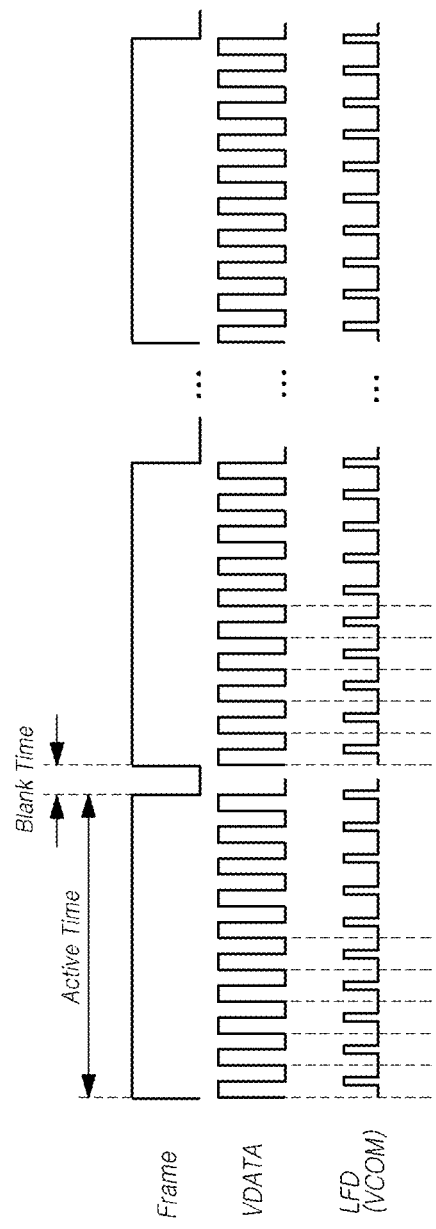
FIGS. 10 and 11 are diagrams illustrating synchronization between a data voltage and a common voltage during time-free driving of the touch display device according to embodiments of the present disclosure.
Figure 11:
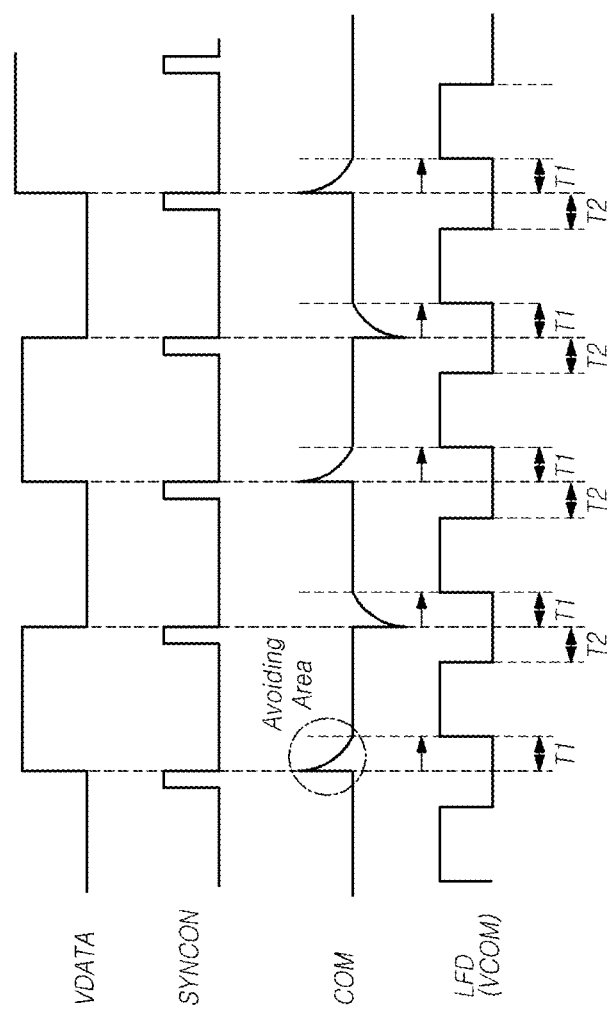

FIGS. 10 and 11 are diagrams illustrating synchronization between a data voltage VDATA and a common voltage VCOM during time-free driving of the touch display device according to embodiments of the present disclosure.

When the touch display device according to embodiments of the present disclosure performs the driving operation in the time-free driving mode, during an active time for each frame time, the source driving circuit SDC may supply a data voltage VDATA to the plurality of data lines DL, and the touch driving circuit TDC may supply a common voltage VCOM to the plurality of common electrodes COM.

The plurality of common electrodes COM are display driving-related electrodes that correspond to pixel electrodes to form an electric field, and are also touch electrodes TE for touch sensing.

Therefore, the common voltage VCOM applied to the plurality of common electrodes COM is a display driving voltage and is also a touch driving signal LFD.

This common voltage VCOM may be a modulated signal synchronized with a data voltage VDATA or a modulated signal synchronized with a data synchronous signal SYNCON.

Here, the data synchronous signal SYNCON may be a signal synchronized with the data voltage VDATA.

Meanwhile, the touch driving circuit TDC may detect a touch sensing signal from at least one of the plurality of common electrodes COM, and may generate and output sensing data (touch raw data) based on the detected signal.

The micro control unit MCU may receive the sensing data (touch row data) from the touch driving circuit TDC, and may determine the presence or absence of a touch and/or touch coordinates using the received sensing data.

Meanwhile, the source driving circuit SDC may be implemented with one source driving integrated circuit or two or more source driving integrated circuits. The touch driving circuit TDC may be implemented with one touch driving integrated circuit or two or more touch driving integrated circuits.

In addition, the source driving integrated circuits implementing the source driving circuit SDC and the touch driving integrated circuits implementing the touch driving circuit TDC may be combined, thereby being implemented as a combined driving integrated circuit.

That is, the touch display device according to embodiments of the present disclosure may include one or more combined driving integrated circuits, and each combined driving integrated circuit may include a source driving integrated circuit and a touch driving integrated circuit.

As described above, the common voltage VCOM, which may be the touch driving signal LFD, is synchronized with the data voltage VDATA or the data synchronous signal SYNCON. Thus, even if the voltage state of the common electrode COM corresponding to the touch electrode TE changes due to the state change of the data voltage VDATA in the data line DL, the touch sensitivity is not deteriorated and the display touch crosstalk can be eliminated. That is, the influence of the data line DL on the common electrode COM corresponding to the touch electrode TE can be minimized.

Referring to FIG. 11, the common voltage VCOM, which is a touch driving signal LFD, may be a modulated signal, of which the voltage level swings.

The common voltage VCOM is an AC voltage signal, of which the voltage level changes, and is a pulse signal including a plurality of pulses.

The common voltage VCOM may be a modulated signal obtained by changing the width, amplitude, phase, or the like of the pulse thereof.

For example, the common voltage VCOM may be one of a pulse amplitude modulation (PAM) signal, a pulse width modulation (PWM) signal, a pulse position modulation (PPM) signal, a pulse frequency modulation (PFM) signal, etc.

In the following description, it is assumed that the common voltage VCOM is a PWM signal.

Referring to FIG. 11, the common voltage VCOM may be primarily subjected to a voltage level change (in FIG. 11, from a low level to a high level) after a predetermined delay time T1 at a first state change point of the data voltage VDATA or the data synchronous signal SYNCON.

Here, at the first state change point, the data voltage VDATA may be changed from a first level (e.g., the low level) to a second level (e.g., the high level), and the data synchronous signal SYNCON may be changed from a second level (e.g., the high level) to a first level (e.g., the low level).

Referring to FIG. 11, the common voltage VCOM may be subjected to a voltage level change after a predetermined delay time T1 from a first state change point of the data voltage VDATA or the data synchronous signal SYNCON. Thereafter, the voltage level is secondarily changed (in FIG. 11, from the high level to the low level) again at a second state change point of the data voltage VDATA or the data synchronous signal SYNCON or a point that is earlier than the second state change point by a predetermined control time T2 (T2 is 0 or larger).

Here, at the second state change point, the data voltage VDATA is changed from the second level (e.g., the high level) to the first level (e.g., the low level), and the data synchronous signal SYNCON is changed from the second level (e.g., the high level) to the first level (e.g., the low level).

According to the above description, since the high level voltage of the touch driving signal LFD corresponding to the common voltage VCOM is applied to the common electrode COM by avoiding a period in which an unnecessary voltage fluctuation (e.g., an instantaneous peak voltage) occurs in the common electrode COM in accordance with the state change (low level<->high level) of the data voltage VDATA, it is possible to prevent touch sensitivity from being deteriorated due to the state change of the data voltage VDATA.

As described above, while the common voltage VCOM, which is a modulated signal synchronized with the data voltage VDATA or a modulated signal synchronized with the data synchronous signal SYNCON synchronized with the data voltage VDATA, is supplied to the plurality of common electrodes COM, an image displayed through the display panel DISP may be in an inversion-type display pattern.

As described above, in the display pattern in which display touch crosstalk is likely to occur, occurrence of the display touch crosstalk can be prevented through synchronization between the data voltage VDATA and the common voltage VCOM.

Figure 12A:
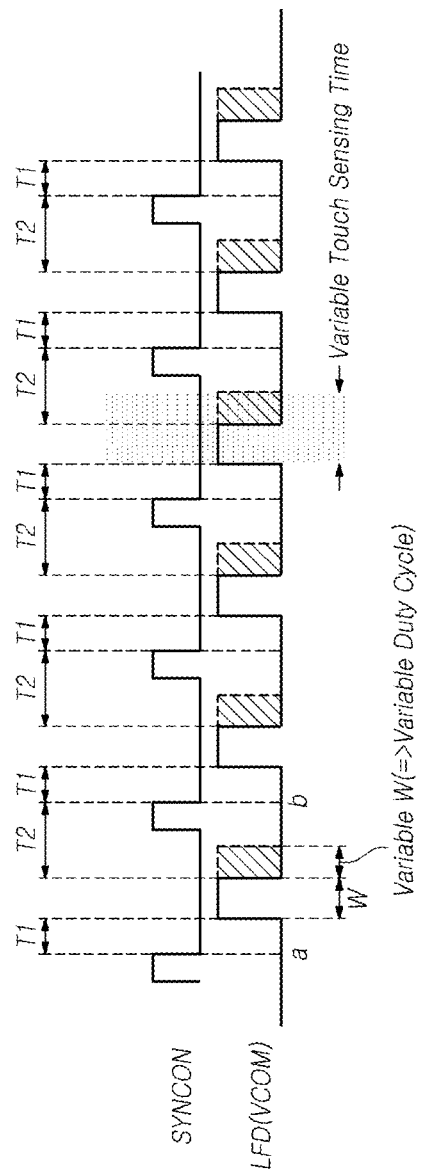
FIG. 12A is a diagram for explaining signal control of a common voltage during time-free driving of the touch display device according to embodiments of the present disclosure.

FIG. 12A is a diagram for explaining signal control of a common voltage VCOM during time-free driving of the touch display device according to embodiments of the present disclosure.

Referring to FIG. 12A, during the time-free driving, (1) the common voltage VCOM serving as a load-free driving signal is primarily subjected to a voltage level change (e.g., changed from the low level to the high level) after a predetermined delay time T1 from a first state change point a of the data voltage VDATA or the data synchronous signal SYNCON, (2) the changed voltage level (e.g., the high level) is maintained for a predetermined time W, and (3) the voltage level is secondarily changed (e.g., changed from the high level to the lower level) at a point earlier by a predetermined control time T2 than a second state change point b of the data voltage VDATA or the data synchronous signal SYNCON.

Here, in the common voltage VCOM, the time W during which the high level is maintained corresponds to the pulse width of the common voltage VCOM. The pulse width W of the common voltage VCOM corresponds to the touch sensing time (touch driving time).

Referring to the signal waveform relationship between the data synchronous signal SYNCON/data voltage VDATA and the common voltage VCOM, the delay time T1 associated with the primary voltage level change (e.g., the low level→the high level) when the voltage level of the common voltage VCOM is changed by being synchronized with the data synchronous signal SYNCON or the data voltage VDATA may be constant.

As described above, as the delay time T1 associated with the primary voltage level change of the common voltage VCOM is constant, the common voltage VCOM may be a modulated signal having a constant frequency.

Referring to the signal waveform relationship between the data synchronous signal SYNCON/data voltage VDATA and the common voltage VCOM, the delay time T2 associated with the secondary voltage level change (e.g., the high level→the low level) may be variable.

The control time T2 associated with the secondary voltage level change of the common voltage VCOM corresponds to the time in which the pulse width W of the common voltage VCOM can be controlled.

As the control time T2 varies, the pulse width W of the common voltage VCOM may be variable. Here, the pulse width W of the common voltage VCOM is a time length of a high-level interval, which may mean a touch sensing time (touch driving time). The variation of the pulse width W may affect the touch driving (touch sensing).

As described above, as the pulse width W of the common voltage VCOM varies, the common voltage VCOM may have a constant frequency and a duty cycle or a duty ratio thereof may be variable.

Here, the duty cycle of the common voltage VCOM is the ratio of a touch sensing ON time W relative to one period of the common voltage VCOM (=the touch sensing ON time W+a touch sensing OFF time T1+T2). The duty ratio may mean a ratio of the touch sensing ON time W relative to the touch sensing OFF time T1+T2.

Referring to FIG. 12A, the pulse width W of the common voltage VCOM may be widened to a point b.

Meanwhile, in the touch display device, various kinds of noise may occur. In order to normally perform the display driving and the touch driving without being affected by such noise, it may be helpful to vary the frequency of the common voltage VCOM in the form of a modulation signal (e.g., PWM).

However, in the case of the time-free driving method in which the display driving and the touch driving are simultaneously performed, it is necessary that the common voltage VCOM is synchronized with the data voltage VDATA or the data synchronous signal SYNCON. In this case, there is a limit in the frequency variation of the common voltage VCOM.

Therefore, as described above, varying the duty cycle or the duty ratio of the common voltage VCOM while maintaining the frequency of the common voltage VCOM enables noise avoidance, thereby improving display performance and touch performance.

Taking this into consideration, the adjustment of the duty cycle or the duty ratio of the common voltage VCOM through the variation of the pulse width W of the common voltage VCOM may be adaptively adjusted according to the noise level.

The noise level may be evaluated based on the magnitude of a signal measured at a touch electrode TE of the display panel DISP.

For example, the touch display device may store a reference magnitude of a signal measured by a touch electrode TE in the absence of a touch in advance, sense the magnitude of a size at the noise in the absence of a touch in order to evaluate the current noise level, compare the magnitude of the signal sensed thereby with the stored reference magnitude, and evaluate the noise level according to the degree of a difference value obtained through the comparison.

For example, the touch may evaluate that the larger the difference value, the higher the noise level of the touch display device. The touch display device may increase the change amount of the duty cycle or the duty ratio of the common voltage VCOM as the evaluated noise level increases and may change the duty cycle or duty ratio of the common voltage VCOM more frequently when the noise level changes frequently.

Figure 12B:
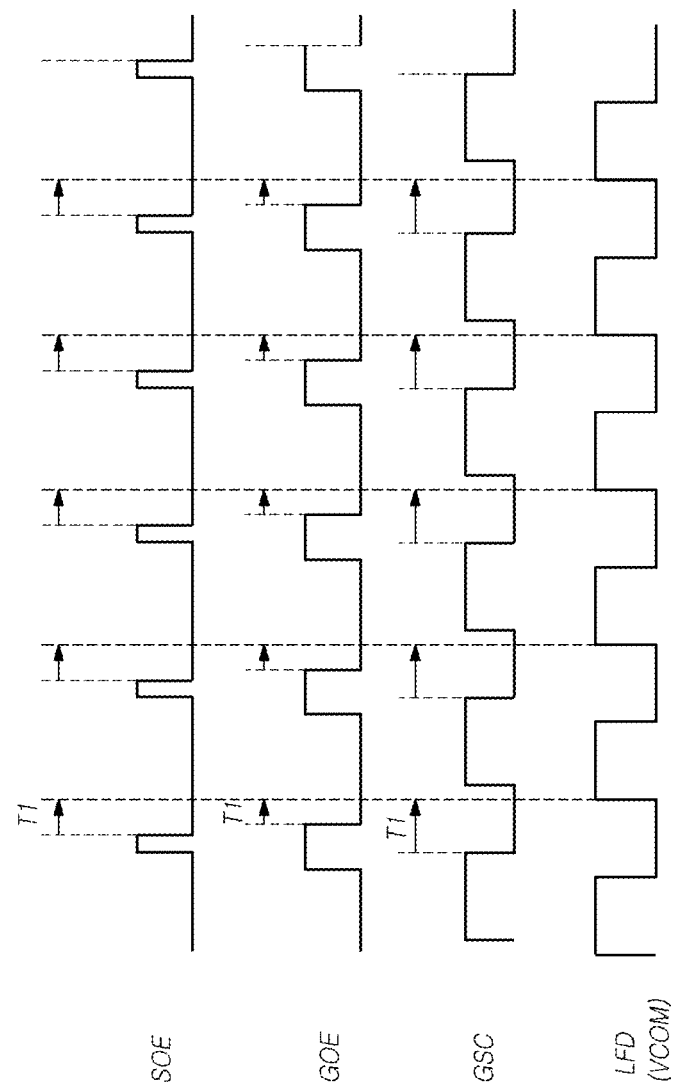
FIG. 12B is a view illustrating examples of a display drive control signal that may be utilized as a data synchronous signal for synchronizing a common voltage with a data voltage in the touch display device according to embodiments of the present disclosure.

FIG. 12B is a view illustrating examples of a display drive control signal that may be utilized as a data synchronous signal SYNCON for synchronizing a common voltage VCOM with a data voltage VDATA in the touch display device according to embodiments of the present disclosure.

Since the touch display device according to embodiments of the present disclosure performs the driving operation in the time-free driving method, the common voltage VCOM is a display driving-related voltage corresponding to a pixel voltage, and is also a touch driving signal LFD for touch sensing.

This common voltage VCOM is synchronized with the data voltage VDATA.

As a result, the common voltage VCOM is changed in voltage level while avoiding the timing at which the voltage value is greatly changed at the data voltage VDATA.

For this purpose, the voltage level of the common voltage VCOM may swing based on the voltage state change timing of the data voltage VDATA.

Unlike this, the voltage level of the common voltage VCOM may swing based on a signal SYNCON other than the data voltage VDATA, that is, a data synchronous signal SYNCON that is synchronized with the data voltage VDATA.

The data synchronous signal SYNCON is a signal synchronized with the data voltage VDATA and may be a dedicated control signal for controlling the voltage level change timing of the common voltage VCOM.

Unlike this, the data synchronous signal SYNCON may utilize an internal operation control signal for a display driving control as a control signal for controlling the voltage level change timing of the common voltage VCOM.

The internal operation control signal for the display driving control has already been synchronized with the voltage state change timing of the data voltage VDATA.

For example, the internal operation control signal used as the data synchronous signal SYNCON may be a data driving control signal DCS supplied from the timing controller TCON to the source driving circuit SDC.

For example, the data driving control signal DCS may include a source start pulse (SSP), a source sampling clock (SSC), a source output enable signal (SOE), etc.

As another example, the internal operation control signal used as the data synchronous signal SYNCON may be a gate driving control signal GCS supplied from the timing controller TCON to the gate driving circuit GDC.

For example, the gate drive control signal GCS may be a gate start pulse (GSP), a gate shift clock (GSC), a gate output enable signal (GOE), a gate clock signal (GCLK), a gate pulse modulation control signal (GPMCS), or the like. Here, the GPMCS is a signal for controlling the gate pulse modulation (GPM). For example, the GPMCS may include MCLK or FLK. The GPM is a modulation technique that modifies the gate pulses.

As illustrated in FIG. 12B, the delay time T1 for avoiding the state change timing of the data voltage VDATA may vary depending on the type of the data synchronous signal SYNCON.

As described above, by using an existing internal operation control signal for a display driving control as the data synchronous signal SYNCON, there is an advantage in that no separate control signal may be used.

Hereinafter, a ground modulation function and a method of synchronizing a common voltage VCOM, which is a touch driving signal LFD, with a data voltage VDATA or a data synchronous signal SYNCON using the ground modulation function will be described.

Figure 13:
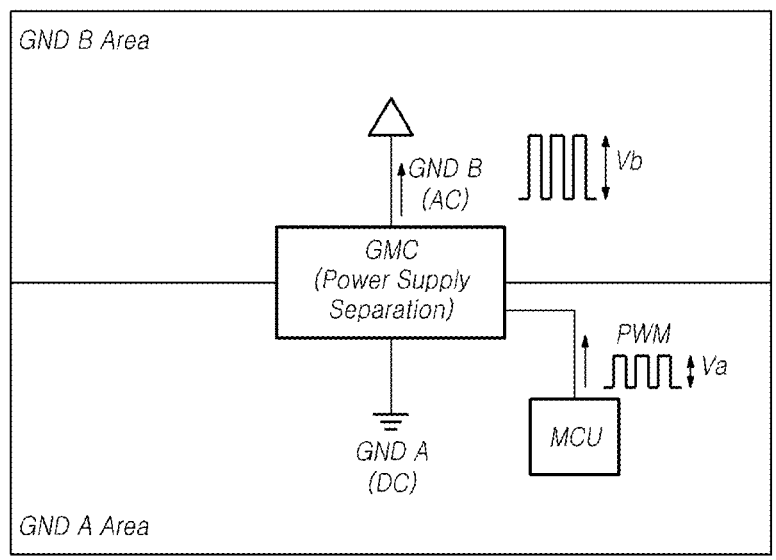
FIG. 13 is a diagram illustrating two ground voltages and aground modulation circuit for using the ground voltages in the touch display device according to embodiments of the present disclosure.
Figure 14:
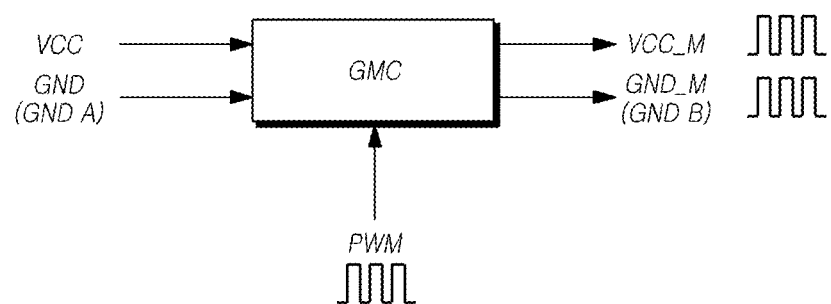
FIG. 14 is a diagram illustrating a ground modulation circuit in the touch display device according to embodiments of the present disclosure.
Figure 15:
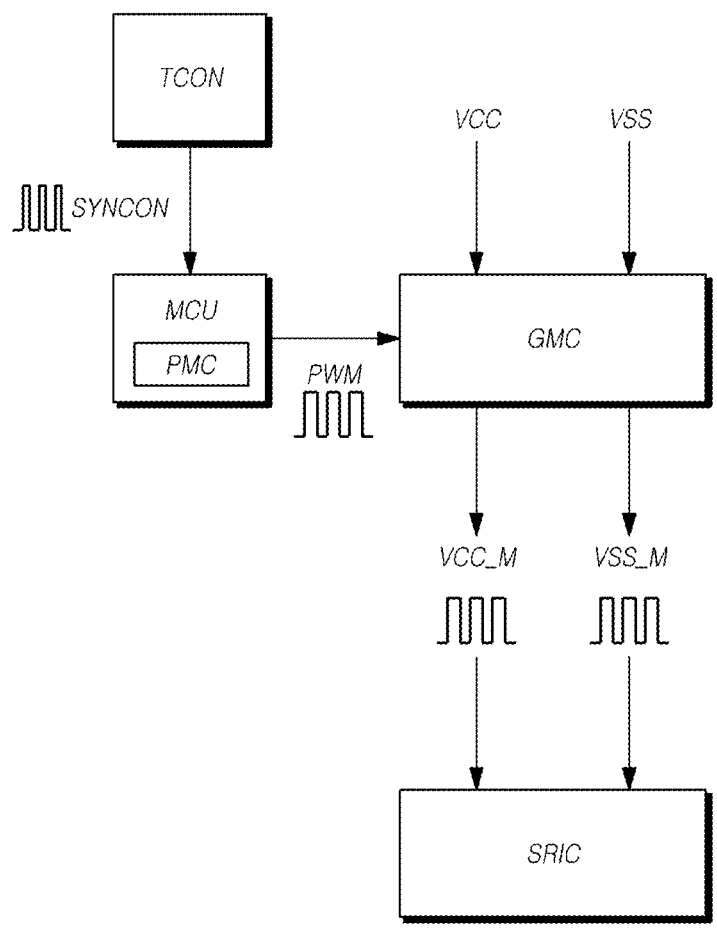
FIG. 15 is a diagram illustrating a configuration for performing a ground modulation function for data synchronization of a common voltage which is a touch driving signal in the touch display device according to embodiments of the present disclosure.

FIG. 13 is a diagram illustrating two ground voltages GND A and GND B and a ground modulation circuit GMC for using the ground voltages in the touch display device according to embodiments of the present disclosure. FIG. 14 is a diagram illustrating the ground modulation circuit GMC in the touch display device according to embodiments of the present disclosure. FIG. 15 is a diagram illustrating a configuration for performing a ground modulation function for data synchronization of a common voltage VCOM which is a touch driving signal LFD in the touch display device according to embodiments of the present disclosure.

The touch display device according to embodiments of the present disclosure may utilize two different ground voltages GND A and GND B.

Various configurations included in the touch display device according to embodiments of the present disclosure may be grounded to one or both of two ground voltages GND A and GND B.

Accordingly, the touch display device may include configurations grounded to the first ground voltage GND A corresponding to the ground voltage GND, which is a DC voltage, configurations grounded to the second ground voltage GND B, which is an AC voltage, and configurations both the first ground voltage GND A and the second ground voltage GND B.

A micro control unit MCU, a timing control unit TCON, etc. may be present in a first ground voltage area (GND A area) which is an area grounded to the first ground voltage GND A. That is, the micro control unit MCU, the timing control unit TCON, and the like may be grounded to the first ground voltage GND A, which is a DC voltage.

A display panel DISP, a gate drive circuit GDC, a level shifter, etc. may be present in a second ground voltage area (GND B Area) which is an area grounded to the second ground voltage GND B. That is, the display panel DISP, the gate drive circuit GDC, the level shifter, etc. may be grounded to the second ground voltage GND B, which is an AC voltage.

The source driving circuit SDC transmits a signal to the display panel DISP grounded to the second ground voltage GND B, which is an AC voltage, and also transmits a signal to the timing control unit TCON grounded to the first ground voltage GND A, which is a DC voltage. Thus, the source driving circuit SDC should be grounded to both the first ground voltage GND A, which is a DC voltage and the second ground voltage GND B, which is an AC voltage.

In addition, the touch driving circuit TDC transmits a signal to the display panel DISP grounded to the second ground voltage GND B, which is an AC voltage, and also transmits a signal to the micro control unit MCU grounded to the first ground voltage GND A, which is a DC voltage. Thus, the touch driving circuit TDC should be grounded to both the first ground voltage GND A, which is a DC voltage and the second ground voltage GND B, which is an AC voltage.

According to the above description, it is possible to efficiently use two ground voltages GND A and GND B in a single touch display device. Through this, it is possible to simultaneously perform image display and touch sensing by performing time-free driving efficiently.

Furthermore, the voltages applied to various electrodes and wires arranged on the display panel DISP swing together with the second ground voltage GND B, whereby the common electrode COM, which is a touch electrode TE, does not form unnecessary parasitic capacitance with other electrodes or wires, so that touch sensitivity can be further improved.

Referring to FIGS. 13 to 15, the touch display device according to embodiments of the present disclosure may further include a pulse modulation circuit PMC, a ground modulation circuit GMC, etc. in order to generate the second ground voltage GND B, which is an AC voltage.

The pulse modulation circuit PMC may output a pulse modulation signal (e.g., PWM) to the ground modulation circuit GMC.

The pulse modulation circuit PMC may be included outside or inside the micro control unit MCU.

The ground modulation circuit GMC may output the second ground voltage GND B which is a ground voltage modulated in accordance with the pulse modulation signal (e.g., PWM) input from the pulse modulation circuit PMC.

When generating the second ground voltage GND B based on the pulse modulation signal PWM, the ground modulation circuit GMC may generate the second ground voltage GND B so as to correspond to the pulse modulation signal PWM in frequency and phase.

However, when generating the second ground voltage GND B based on the pulse modulation signal PWM, the ground modulation circuit GMC may generate the second ground voltage GND B having a desired amplitude Vb regardless of the amplitude Va of the pulse modulation signal PWM.

Therefore, the amplitude Vb of the second ground voltage GND B may be equal to, less than, or greater than the amplitude Va of the pulse modulation signal PWM.

The ground modulation circuit GMC may include a voltage level change circuit such as a level shifter.

When generating the second ground voltage GND B based on the pulse modulation signal PWM, such a ground modulation circuit GMC may generate the second ground voltage GND B based on the voltage level of the first ground voltage GND A, which is a DC voltage.

In addition, the second ground voltage GND B generated by the ground modulation circuit GMC may look like a modulated signal, which is not constant in voltage and has two or more voltage levels when viewed with reference to the first ground voltage GND A.

The common voltage VCOM applied to the common electrodes COM, which also serve as the touch electrodes TE, may correspond to the second ground voltage GND B, which is a modulated ground voltage output from the ground modulation circuit GMC.

For example, the common voltage VCOM may have a frequency and a phase corresponding to the frequency and the phase of the second ground voltage GND B.

Since the second ground voltage GND B in the form of an AC signal is generated using the aforementioned ground modulation circuit GMC and the generated second ground voltage GND B corresponds to the common voltage VCOM, the common voltage VCOM applied to the common electrodes COM may swing like the modulated second ground voltage GND B.

Meanwhile, the common voltage VCOM output from a circuit such as the source driving circuit SDC may be in the form of a DC voltage. However, since the display panel DISP is grounded to the second ground voltage GND B, the common voltage VCOM applied to the common electrodes COM arranged in the second ground voltage GND B may also show a swinging voltage state like the second ground voltage GND B.

In this case, the common voltage VCOM applied to the common electrodes COM may have a signal waveform which is the same as or similar to that of the second ground voltage GND B.

In addition, the common voltage VCOM applied to the common voltages COM may look like a modulated signal, which is not constant in voltage and has two or more voltage levels when viewed with reference to the first ground voltage GND A.

Referring to FIGS. 14 and 15, the ground modulation circuit GMC may receive an input of one or more power supply voltages VCC and VSS, a first ground voltage GND A, which is a ground voltage GND as a DC voltage, and a pulse modulation signal PWM.

The ground modulation circuit GMC may output one or more modulation power supply voltages VCC_M and VSS_M modulated in accordance with the pulse modulation signal PWM.

The ground modulation circuit GMC may output a second ground voltage GND B which is a ground voltage GND_M modulated in accordance with the pulse modulation signal PWM.

The one or more modulation power supply voltages VCC_M, VSS_M and the second ground voltage GND B may correspond to the pulse modulation signal PWM.

For example, since the one or more modulation power supply voltages VCC_M and VSS_M and the second ground voltage GND B are generated on the basis of the pulse modulation signal PWM, the modulation power supply voltages VCC_M and VSS_M and the second ground voltage GND B may have a frequency and a phase, which are the same as those of the frequency and phase of the pulse modulation signal PWM, or a frequency and a phase, which are increased or decreased in a predetermined ratio to those of the pulse modulation signal PWM.

The ground modulation circuit GMC may output one or more modulation power supply voltages VCC_M and VSS_M and a second ground voltage GND B to the source driving circuit SDC and/or the touch driving circuit TDC, or to an integrated driving circuit SRIC, which is implemented by integrating the driving circuit SDC and the touch driving circuit TDC.

According to the above description, the ground modulation circuit GMC may not only generate and supply the second ground voltage GND B in the form of an AC voltage using the pulse modulation signal PWM, but also generate and supply one or more modulation power supply voltages VCC_M and VSS_M for use in source driving and/or touch driving.

Meanwhile, referring to FIG. 15, the timing controller TCON may output a data synchronous signal SYNCON to the pulse modulation circuit PMC.

Thus, the pulse modulation circuit PMC may generate and output a pulse modulation signal (e.g., PWM) synchronized with the data synchronous signal SYNCON.

That is, the pulse modulation signal PWM output from the pulse modulation circuit PMC may be synchronized with the data voltage VDATA or the data synchronous signal SYNCON.

As described above, since the pulse modulation signal PWM used for ground modulation is synchronized with the data voltage VDATA or the data synchronous signal SYNCON, the second ground voltage GND B modulated in accordance with the pulse modulation signal PWM may also be synchronized with the data voltage VDATA or the data synchronous signal SYNCON. Thus, the common voltage VCOM, which is applied to the plurality of common electrodes COM arranged on the display panel DISP grounded to the second ground voltage GND B and is a touch driving signal LFD, may swing like the ground voltage GND B so as to be synchronized with the data voltage VDATA or the data synchronous signal SYNCON.

Figure 16:
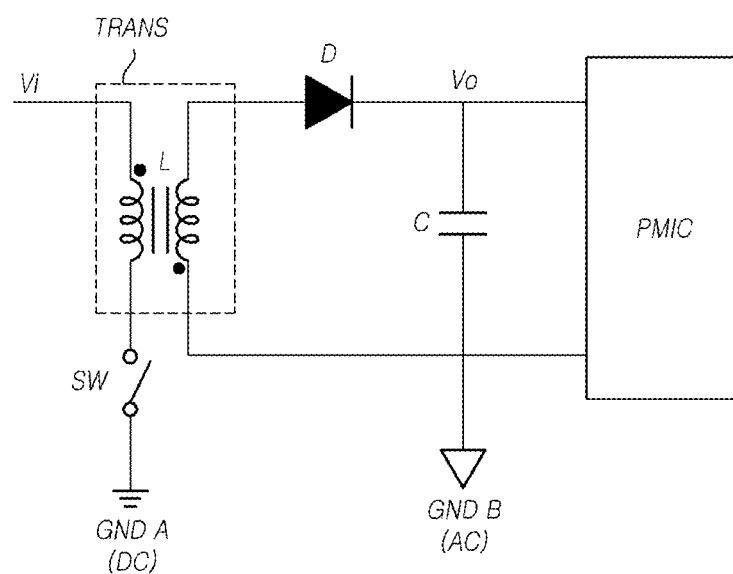
FIG. 16 is an exemplary diagram of a power supply separation circuit in the touch display device according to embodiments of the present disclosure.

Meanwhile, referring to FIGS. 13 and 16, the ground modulation circuit GMC may have a power supply separation function for separating the first ground voltage GND A in the form of a DC voltage and the second ground voltage GND B in the form of an AC voltage.

For this purpose, the ground modulation circuit GMC may include a power supply separation circuit including at least one of a flyback converter, a flybuck converter, and a transformer.

Therefore, the touch display device according to embodiments of the present disclosure may utilize two different ground voltages GND A and GND B as a ground power supply.

FIG. 16 is an exemplary diagram of a power supply separation circuit in the touch display device according to embodiments of the present disclosure.

FIG. 16 is an example of a power source separation circuit, which is a flyback converter.

The flyback converter may include a transformer TRANS, a switch SW, a diode D, an output capacitor C, etc.

The switch SW may be electrically connected between the primary winding of the transformer TRANS and the first ground voltage GND A. An output voltage Vo and the second ground voltage GND B are applied to both ends of the output capacitor C.

When the switch SW is closed, the primary side of the transformer TRANS is directly connected to an input voltage source Vi. The primary current and magnetic fluxes of the transformer TRANS increase. Since a voltage having a polarity opposite the polarity of the primary winding is induced in the secondary winding of the transformer TRANS, the voltage induced in the secondary winding becomes a negative voltage. Thus, the diode D is reverse-biased. That is, the diode D is cut off. Therefore, no current flows in the secondary winding and current flows only in the primary winding such that energy is accumulated in the transformer TRANS. In addition, the output capacitor C is capable of supplying energy to a power management circuit PMIC, which is the output load.

When the switch SW is opened, the primary current and the magnetic fluxes decrease. In the secondary winding, a voltage having the polarity opposite the previous polarity is induced. That is, the secondary voltage becomes the positive polarity. As a result, the diode D is forward-biased to be conductive, and current flows in the transformer TRANS. The energy from the transformer TRANS is capable of recharging the capacitor C and supplying power to the power management circuit PMIC, which is the output load.

The transformer TRANS is capable of serving not only as a power supply separator for isolation between input and output, but also as an inductor of a filter.

The above-mentioned first ground voltage GND A, second ground voltage GND B, and common voltage VCOM will be described once again.

The first ground voltage GND A is in the form of a DC voltage maintaining a constant voltage, but the second ground voltage GND B may be a modulated voltage in comparison with the first ground voltage GND A. That is, the voltage level of the second ground voltage GND B is not maintained at a constant voltage level in comparison with the first ground voltage GND A, but may be a voltage that is a modulated signal, of which the voltage level changes with time.

Since the second ground voltage GND B is in the form of a modulated signal, the common voltage VCOM applied to the display panel DISP may also be recognized as being modulated therewith.

That is, the common voltage VCOM may be recognized as being modulated such that the voltage level thereof changes with time in comparison with the first ground voltage GND A.

However, the common voltage VCOM may be regarded as a DC voltage, of which the voltage level does not change with time, as viewed in comparison with the second ground voltage GND B. That is, the common voltage VCOM is a signal, of which the voltage level changes with time as viewed from the first ground voltage GND A side. However, the common voltage VCOM may be a signal, of which the voltage level is constant without being changed when viewed from the second ground voltage GND B side.

Figure 17:
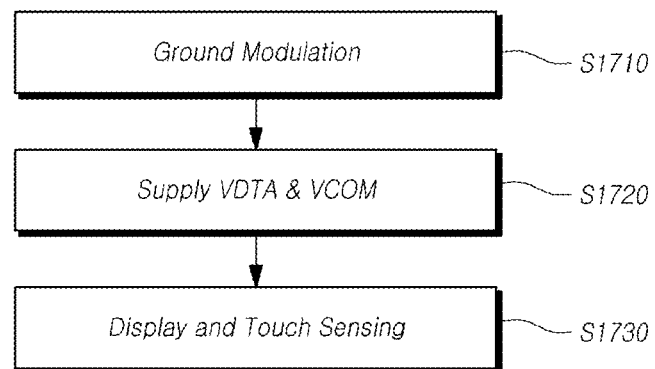
FIG. 17 is a flowchart of a method of driving the touch display device according to embodiments of the present disclosure.

FIG. 17 is a flowchart of a method of driving the touch display device according to embodiments of the present disclosure.

Referring to FIG. 17, a method of driving a touch display device according to embodiments of the present disclosure includes supplying a data voltage VDATA to a plurality of data lines DL and supplying a common voltage VCOM to a plurality of common electrodes COM (S1720), and displaying an image through a display panel DISP and sensing a touch based on a signal detected from at least one of the plurality of common electrodes COM (S1730).

When the touch display device according to embodiments of the present disclosure performs time-free driving (simultaneous driving), the plurality of common electrodes COM may also serve as touch electrodes TE.

Accordingly, the common voltage VCOM is a voltage that forms an electric field with a pixel voltage for image display, and may also be a touch driving signal LFD applied to the touch electrodes TE for touch sensing.

In order to prevent a display touch crosstalk caused by a state change of the data voltage VDATA occurring in a specific display pattern, the common voltage VCOM may be a modulation signal (a pulse signal including a plurality of pulses) synchronized with the data voltage VDATA, or a modulation signal (a pulse signal including a plurality of pulses) synchronized with a data synchronous signal SYNCON, which is synchronized with the data voltage VDATA.

When the driving method described above is used, the common voltage VCOM, which may be the touch driving signal LFD, is synchronized with the data voltage VDATA or the data synchronous signal SYNCON. Thus, even if the voltage state of the common electrode COM corresponding to the touch electrode TE changes due to the state change of the data voltage VDATA in the data line DL, the touch sensitivity is not deteriorated and the display touch crosstalk can be eliminated. That is, the influence of the data line DL on the common electrode COM corresponding to the touch electrode TE can be minimized.

The display panel DISP may be grounded to the second ground voltage GND B in the form of an AC signal. Here, the AC signal or the AC voltage described in this specification may include all signals, each of which has a voltage inconstant over time, or all the inconstant voltages. Also, the AC signal or the AC voltage may include all signals, each of which has an inconstant voltage having a changing polarity, or the inconstant voltages thereof, and all signals, each of which has an inconstant voltage having an unchanged polarity, or the inconstant voltages thereof.

Accordingly, before step S1720, the driving method of the touch display device according to embodiments of the present disclosure may further include generating the second ground voltage GND B, which is a modulation signal corresponding to a frequency and a phase of the common voltage VCOM and is an AC signal (S1710).

As described above, since the second ground voltage GND B is generated and the display panel DISP is grounded to the second ground voltage GDN B, the common voltage VCOM, which is a DC voltage applied to the common electrodes COM arranged on the display panel DISP, swings like the second ground voltage GDN B, and thus, the common voltage VCOM becomes an AC signal, which is the same as or similar to the second ground voltage GDN B.

In step S1710, the second ground voltage GND B is generated in synchronization with the data voltage VDATA or the data synchronous signal SYNCON.

Accordingly, since the second ground voltage GND B synchronized with the data voltage VDATA or the data synchronous signal SYNCON is grounded on the display panel DISP, the common voltage VCOM, which is a DC voltage applied to the common electrodes COM arranged on the display panel DISP, swings like the second ground voltage GDN B. Thus, the common voltage VCOM is synchronized with the data voltage VDATA or the data synchronous signal SYNCON like the second ground voltage GDN B.

Embodiments of the present disclosure described above will be briefly summarized. A touch display device according to embodiments of the present disclosure may include: a display panel DISP, on which a plurality of data lines DL and gate lines GL are disposed, a plurality of sub-pixels SP defined by the plurality of data lines DL and gate lines GL are arranged, and a plurality of common electrodes COM are disposed; a first circuit (e.g., SRIC) configured to supply a data voltage VDATA to the plurality of data lines DL, and supply a common voltage VCOM, which is a modulation signal synchronized with the data voltage VDATA or a modulation signal synchronized with a data synchronous signal SYNCON synchronized with the data voltage VDATA, to the plurality of common electrodes COM; and a second circuit (e.g., MCU) configured to sense a touch based on a signal detected by the first circuit (e.g., SRIC).

The first circuit (e.g., SRIC) may include a source driving circuit SDC and a touch driving circuit TDC.

A driving circuit of a touch display device according to embodiments of the present disclosure may include: a first driving circuit (e.g., SDC) configured to supply a data voltage VDTA to a plurality of data lines DL; and a second driving circuit (e.g., TDC) configured to supply a common voltage VCOM, which is a modulation signal synchronized with the data voltage VDATA or a modulation signal synchronized with a data synchronous signal SYNCON synchronized with the data voltage VDATA, to a plurality of common electrodes COM, and detect a signal for touch sensing from at least one of the plurality of common electrodes COM.

A touch display device according to embodiments of the present disclosure may include: a display panel DISP, on which a plurality of data lines DL and gate lines GL are disposed, a plurality of sub-pixels SP defined by the plurality of data lines DL and gate lines GL are arranged, and a plurality of common electrodes COM are disposed; a first circuit (e.g., SRIC) configured to supply a common voltage VCOM to a plurality of common electrodes COM and detect a signal from at least one of the plurality of common electrodes COM; and a second circuit (e.g., MCU) configured to sense a touch based on the detected signal while an image is displayed through the display panel DISP.

The voltage level of the common voltage VCOM may change at the timing when the voltage level of the data voltage VDATA is unchanged.

A touch display device according to embodiments of the present disclosure may include: a display panel DISP, on which a plurality of data lines DL and gate lines GL are disposed, a plurality of sub-pixels SP defined by the plurality of data lines DL and gate lines GL are arranged, and a plurality of touch electrodes TE are disposed; a first circuit (e.g., SRIC) configured to supply a data voltage VDATA to the plurality of data lines DL, supply a touch driving signal LFD to the plurality of touch electrodes TE, and detect a signal from at least one of the plurality of touch electrodes TE; and a second circuit (e.g., MCU) configured to sense a touch based on the detected signal while an image is displayed through the display panel DISP.

The display panel DISP may be grounded to a second ground voltage GNN B which has a predetermined frequency and has been modulated.

The touch driving signal LFD is a modulation signal having a swinging voltage level, and may have a frequency and a phase corresponding to those of the modulated second ground voltage GND B.

The touch driving signal LFD may be the same signal as the second ground voltage GND B.

The voltage level of the touch driving signal LFD may be changed at the timing when the voltage level of the data voltage VDATA is unchanged.

According to the above-described embodiments of the present disclosure, it is possible to provide a touch display device, a driving method, and a driving circuit capable of simultaneously performing display driving and touch driving.

According to the embodiments of the present disclosure, it is possible to provide a touch display device, a driving method, and a driving circuit that prevent touch sensitivity from being affected by display driving.

According to the embodiments of the present disclosure, it is possible to provide a touch display device, a driving method, and a driving circuit capable of performing touch sensing without being affected by data driving.

According to the embodiments of the present disclosure, it is possible to provide a touch display device, a driving method, and a driving circuit capable of preventing touch sensing from being disabled or a touch sensitivity from being deteriorated even if a voltage state of a data voltage is changed.

According to the embodiments of the present disclosure, it is possible to provide a touch display device, a driving method, and a driving circuit capable of preventing touch sensing from being disabled or a touch sensitivity from being deteriorated in a specific display pattern.

According to the embodiments of the present disclosure, it is possible to provide a touch display device, a driving method, and a driving circuit capable of preventing a display touch crosstalk in which a touch-related signal is distorted by display driving even though the display driving and touch driving are simultaneously performed.

The above description and the accompanying drawings provide an example of the technical idea of the present disclosure for illustrative purposes only. Those having ordinary knowledge in the technical field, to which the present disclosure pertains, will appreciate that various modifications and changes in form, such as combination, separation, substitution, and change of a configuration, are possible without departing from the essential features of the present disclosure. Therefore, the embodiments disclosed in the present disclosure are intended to illustrate the scope of the technical idea of the present disclosure, and the scope of the present disclosure is not limited by the embodiment. The scope of the present disclosure shall be construed on the basis of the accompanying claims in such a manner that all of the technical ideas included within the scope equivalent to the claims belong to the present disclosure.

What is claimed is:

1. A touch display device comprising:
   a display panel including a plurality of data lines, a plurality of gate lines, a plurality of sub-pixels, and a plurality of touch electrodes;
   a first driving circuit configured to supply a data signal to the plurality of data lines; and
   a second driving circuit configured to supply a touch driving signal to the plurality of touch electrodes, the touch driving signal alternating between a first constant voltage and a second constant voltage that is different from the first constant voltage,
   wherein the touch driving signal includes a first signal section having the first constant voltage, a second signal section having the second constant voltage, and a transition section between the first signal section and the second signal section, and wherein at least one display driving signal in the touch display device includes a transition section in which a voltage level of the at least one display driving signal changes, and the transition section of the touch driving signal does not overlap the transition section of the display driving signal.

2. The touch display device of claim 1, further comprising a timing controller configured to control the first driving circuit,
   wherein the at least one display driving signal includes at least one data driving control signal supplied by the timing controller to the first driving circuit,
   wherein the at least one data driving control signal includes a transition section in which a voltage level of the at least one data driving control signal is changed, and
   wherein the transition section of the touch driving signal does not overlap the transition section of the at least one data driving control signal.

3. The touch display device of claim 2, wherein the at least one data driving control signal includes a constant voltage section before or after the transition section of the at least one data driving control signal, and
   wherein the transition section of the touch driving signal overlaps the constant voltage section of the at least one data driving control signal.

4. The touch display device of claim 2, wherein the at least one data driving control signal includes at least one of a source start pulse, a source sampling clock, and a source output enable signal.

5. The touch display device of claim 1, further comprising a third driving circuit configured to supply a plurality of scan signals to the plurality of gate lines, and a timing controller configured to control the first driving circuit and the third driving circuit,
   wherein the at least one display driving signal includes at least one gate driving control signal supplied by the timing controller to the third driving circuit,
   wherein the at least one gate driving control signal includes a transition section in which a voltage level of the at least one gate driving control signal changes, and
   wherein the transition section of the touch driving signal does not overlap the transition section of the at least one gate driving control signal.

6. The touch display device of claim 5, wherein the at least one gate driving control signal includes a constant voltage section after the transition section of the at least one gate driving control signal, and
   wherein the transition section of the touch driving signal overlaps the constant voltage section of the at least one gate driving control signal.

7. The touch display device of claim 5, wherein the at least one gate driving control signal includes at least one of a gate start pulse, a gate shift clock, a gate output enable signal, a gate clock signal, and a gate pulse modulation control signal.

8. The touch display device of claim 1, wherein the data signal includes a transition section in which a voltage level of the data signal is changed, and
wherein the transition section of the touch driving signal does not overlap the transition section of the data signal as the display driving signal.

9. The touch display device of claim 1, wherein the data signal includes a transition section in which a voltage level of the data signal is changed, and
wherein the first signal section of the touch driving signal overlaps with the transition section of the data signal.

10. The touch display device of claim 1, wherein touch sensing using the touch driving signal and image display using the data signal are performed simultaneously.

11. The touch display device of claim 1, wherein a width of the second signal section of the touch driving signal is constant.

12. The touch display device of claim 1, wherein the touch driving signal has a constant frequency and a variable duty cycle or duty ratio.

13. The touch display device of claim 1, wherein the touch driving signal is a modulation signal synchronized with the data signal or a modulation signal synchronized with a data synchronous signal that is synchronized with the data signal.

14. The touch display device of claim 13, wherein the touch driving signal is changed from the first constant voltage to the second constant voltage at a first time point after a predetermined delay time at a first state change time point when the voltage level of the data signal or the data synchronization signal is changed, during a first period, and
wherein a length of the signal period during which a common voltage has the second constant voltage is a first length, and during a second period different from the first period, a length of the signal period in which the common voltage has the second constant voltage is a second length different from the first length.

15. The touch display device of claim 14, wherein the touch driving signal is changed from the second constant voltage to the first constant voltage at a second time point before a predetermined control time than a second state change time point when the voltage level of the data signal or the data synchronization signal is changed, during the first period, the predetermined control time is a first control time, and during the second period different from the first period, the predetermined control time is a second control time different from the first length.

16. The touch display device of claim 1, wherein an area of each of the plurality of touch electrodes overlaps two or more sub-pixel areas.

17. The touch display device of claim 1, wherein an image displayed through the display panel while the touch driving signal is supplied to the plurality of touch electrodes is an inversion-type display pattern.

18. The touch display device of claim 1, wherein the touch display device is a liquid crystal display device or an organic light-emitting diode display.

19. A driving circuit of a touch display device comprising a display panel including plurality of data lines, a plurality of gate lines, a plurality of sub-pixels defined by the plurality of data lines and the plurality of gate lines, and a plurality of touch electrodes, the driving circuit comprising:
a first driving circuit configured to receive at least one display driving signal and supply a data signal to the plurality of data lines; and
a second driving circuit configured to supply a touch driving signal to the plurality of touch electrodes, the touch driving signal alternating between a first constant voltage and a second constant voltage that is different from the first constant voltage,
wherein the touch driving signal includes a first signal section having the first constant voltage, a second signal section having the second constant voltage, and a transition section between the first signal section and the second signal section,
wherein the data signal or the at least one display driving control signal includes a transition section in which a voltage level of the data signal or the at least one display driving control signal changes, and
wherein the transition section of the touch driving signal does not overlap the transition section of the data signal or the at least one display driving control signal.

20. The driving circuit of claim 19, wherein the data signal includes a transition section in which a voltage level of the data signal is changed, and
wherein the first signal section of the touch driving signal overlaps with the transition section of the data signal.

* * * * *